(12) United States Patent
Møller et al.

(10) Patent No.: US 12,415,161 B2
(45) Date of Patent: Sep. 16, 2025

(54) HOLLOW FIBER MODULE

(71) Applicant: AQUAPORIN A/S, Kongens Lyngby (DK)

(72) Inventors: Michael Holm Møller, Lund (SE); Krzysztof Trzaskus, Kongens Lyngby (DK); Mads Friis Andersen, Valby (DK); Xuan Tung Nguyen, Singapore (SG); Simon Alvisse, Singapore (SG); Guofei Sun, Singapore (SG)

(73) Assignee: AQUAPORIN A/S, Kongens Lyngby (DE)

( * ) Notice: Subject to any disclaimer, the term of this patent is extended or adjusted under 35 U.S.C. 154(b) by 1063 days.

(21) Appl. No.: 17/413,082

(22) PCT Filed: Dec. 11, 2019

(86) PCT No.: PCT/EP2019/084667
§ 371 (c)(1),
(2) Date: Jun. 11, 2021

(87) PCT Pub. No.: WO2020/120583
PCT Pub. Date: Jun. 18, 2020

(65) Prior Publication Data
US 2022/0072476 A1 Mar. 10, 2022

(30) Foreign Application Priority Data

Dec. 12, 2018 (DK) .............................. PA 201870809
Nov. 29, 2019 (DK) .............................. PA 201970735

(51) Int. Cl.
*B01D 61/28* (2006.01)
*B01D 63/04* (2006.01)

(52) U.S. Cl.
CPC ........... *B01D 61/28* (2013.01); *B01D 63/046* (2013.01); *B01D 2313/02* (2013.01);
(Continued)

(58) Field of Classification Search
None
See application file for complete search history.

(56) References Cited

U.S. PATENT DOCUMENTS

| 5,401,401 A | 3/1995 | Hickok et al. |
| 6,017,451 A * | 1/2000 | Kopf ..................... B01D 65/00 |
| | | 210/345 |

(Continued)

FOREIGN PATENT DOCUMENTS

| JP | H05508801 | 12/1993 |
| JP | H11507592 A | 7/1999 |

(Continued)

OTHER PUBLICATIONS

Japan Patent Office, Notice of Reasons of Refusal, Application No. 2021-533342, issued Dec. 4, 2023, 4 pages, English Translation, 3 pages.

(Continued)

*Primary Examiner* — Magali P Slawski
*Assistant Examiner* — Eric J McCullough
(74) *Attorney, Agent, or Firm* — ZIEGLER IP LAW GROUP, LLC

(57) ABSTRACT

A hollow fiber module includes hollow fiber cartridges. A port receives a second solution to be treated in a shell side volume and another port for discharging the treated second solution. A first end cap has an inlet for a first solution and a distributer for distributing the first solution to a first end of the hollow fiber cartridges. A second end cap has a collector for collecting the treated first solution from the second end of the hollow fiber cartridges and an outlet for the treated first solution. A first connector has an inlet for the second solution and a distributer for distributing the second solution to a port of the hollow fiber cartridges. A second connector has a collector for collecting the treated second solution (Continued)

from the other port of the hollow fiber cartridges and an outlet for the treated second solution.

9 Claims, 8 Drawing Sheets

(52) U.S. Cl.
CPC .. *B01D 2313/105* (2013.01); *B01D 2313/125* (2013.01); *B01D 2313/201* (2022.08); *B01D 2313/21* (2013.01); *B01D 2313/44* (2013.01); *B01D 2315/10* (2013.01)

(56) References Cited

U.S. PATENT DOCUMENTS

| | | | |
|---|---|---|---|
| 6,165,361 | A | 12/2000 | Heine |
| 9,585,996 | B2 | 3/2017 | Cho |
| 2004/0238431 | A1* | 12/2004 | Johnson ............... B01D 63/046 |
| | | | 210/321.89 |
| 2016/0074570 | A1* | 3/2016 | Cho .................... A61M 1/3679 |
| | | | 210/257.2 |
| 2016/0152932 | A1 | 6/2016 | Herb et al. |
| 2017/0225132 | A1 | 8/2017 | Ozawa |

FOREIGN PATENT DOCUMENTS

| | | |
|---|---|---|
| JP | H06114240 A | 1/2002 |
| JP | 2002143650 A | 5/2002 |
| JP | 2002143680 A | 5/2002 |
| JP | 2002542013 A | 12/2002 |
| JP | H11300175 A | 2/2008 |
| KR | 101572304 B1 | 11/2015 |
| WO | 9116124 A1 | 10/1991 |
| WO | 9641676 A1 | 12/1996 |
| WO | 0062908 A1 | 10/2000 |
| WO | 2000062908 A1 | 10/2000 |
| WO | WO-2011122828 A2 * | 10/2011 ........... B01D 61/147 |

OTHER PUBLICATIONS

Intellectual Property India, Examination Report, Application No. 202147029649, mailed Nov. 28, 2022, 5 pages.
China National Intellectual Property Administration, Notification of the First Office Action, Application No. 201980082701.5, Mailed Nov. 2, 2022, 3 pages.
China Patent Office, Second Office Action, Application No. 2019800827015, Mailed May 13, 2023, 5 pages, English Translation of Claims.
China Patent Office, Second Office Action, Application No. 2019800827015, Mailed May 13, 2023, 9 pages.
Canadian Intellectual Property Office, Examination Search Report, Application No. 3, 122,648, Issued Dec. 15, 2024, 3 Pages.
International Preliminary Report on Patentability, Application No. PCT/EP2019/084667, mailed Nov. 13, 2020, 10 pages.
International Search Report, Application No. PCT/EP2019/084667, mailed Mar. 3, 2020, 3 pages.

* cited by examiner

HOLLOW FIBER MODULE

TECHNICAL FIELD

The aspects of the disclosed embodiments relate to a hollow fiber module comprising a plurality of hollow fiber cartridges, such as 3, 4, 5, 6, 7, 8, or 9 cartridges. The aggregation of a multitude of hollow fiber cartridges in a single module meets the industry need for modules with high membrane area.

BACKGROUND

A trend in module design is to obtain ever increasing membrane areas. For hollow fibre modules, one way of obtaining a higher membrane area could be to simply increase the number of fibers in the bundle of the hollow fibre module. However, above a certain threshold this way of increasing the membrane area of a single module complicates the process for production of the membrane module.

When producing a hollow fibre module, a bundle of hollow fibres is cast ("potted") at each end of the module using a polymer resin. It is of importance that the polymer resin used is cast uniformly around the fibre ends and that air bubbles are avoided. A preferred method for obtaining these effects is to use a centrifuge to spin the polymer resin down as disclosed in e.g. U.S. Pat. No. 4,190,411 A. The centrifugal casting of the potting material works well for smaller modules and/or smaller fibres, however, above a certain threshold size of the module the centrifugal potting method is not feasible and static potting is the preferred choice for production. However, it has proven difficult to use the static method for large bundles of fibres, notably dialysis fibers and small diameter fibres.

The aspects of the disclosed embodiments are directed to a hollow fiber module having an increased membrane area.

SUMMARY

The aspects of the disclosed embodiments are directed to providing a hollow fiber module comprising a plurality of hollow fiber cartridges, wherein
  a. each hollow fiber cartridge comprises a bundle of semi-permeable hollow fibers, said bundle being surrounded by a shell extending longitudinally along the length of the bundle and potted at both ends in a resin, thereby defining a lumen side volume for the treatment of a first solution and a shell side volume for the treatment of a second solution, said shell being provided with a port for receiving the second solution to be treated in the shell side volume and another port for discharging the treated second solution,
  b. A first end cap comprising an inlet for the first solution and a distributer for distributing the first solution to a first end of each of the hollow fiber cartridges,
  c. A second end cap comprising a collector for collecting the treated first solution from the second end of each of the hollow fiber cartridges and an outlet for the treated first solution,
  d. A first connector comprising an inlet for the second solution and a distributer for distributing the second solution to a port of each of the hollow fiber cartridges,
  e. A second connector comprising a collector for collecting the treated second solution from the other port of each of the hollow fiber cartridges and an outlet for the treated second solution.

For industrial purposes modules having a large membrane area are generally preferred for treating large volumes of feed. One way of meeting the demand for larger membrane areas could be to connect standard modules in parallel. However, this way of providing a larger volume is laborious and increases the risk of connecting the standard modules wrongly. Another possibility could be to prepare modules comprising a larger bundle of hollow fibers. However, it has not been possible to obtain a satisfying product simply by scaling up the current preferred centrifugal potting process.

The aspects of the disclosed embodiments meet the need in the industry for providing a larger membrane area than can otherwise be prepared.

While the use of end caps delimits the hollow fiber module in one dimension, i.e. in the length dimension, it is generally useful also to cover the space between the end caps. Therefore, in a certain embodiment of the present disclosure, the first and second end cap are connected at their perimeter with a cover tube, said cover tube enclosing the plurality of cartridges in the longitudinal direction. The cover tube generally is cylindrical and offers the possibility of a surface for attaching labels informing the user of the product.

To increase the stability of the hollow fiber module, it is usually preferred that the first and second connector are connected by a central rod. The increased stability results in that the hollow fiber module remains functional without leakage, even under extreme stress. Another advantage of using a central rod is that the first and second connector remains in the same position relative to each other thereby preventing or reducing torque on the hollow fiber cartridges.

In a preferred embodiment the distributor or the collector comprises a plurality of tubes in fluid connection with the inlet or the outlet, respectively, said tubes being adapted for accommodating a port of a hollow fiber cartridge. The number of tubes of the distributor usually corresponds to the number of modules as each module normally only has a single inlet port. The tubes may be connected to the inlet. In one embodiment, the channels meet in a common joint leading to the single inlet. Suitably, the tube and the first part of the channel extending from the tube forms a cavity corresponding to the port of the hollow fiber cartridge for allowing assembling of the hollow fiber cartridge and the connector.

The collector, similar to the distributor, comprises a plurality of tubes. The plurality of tubes is in fluid connection with the outlet and the tubes are adapted for accommodating a port of a hollow fiber cartridge. The number of tubes corresponds to the number of cartridges as each cartridge normally only has a single inlet port. The tubes may be connected to the outlet by channels provided in the connector. In one embodiment, the channels meet in a common joint leading to a single outlet. Suitably, the tubes and the first part of the channel extending from the tubes forms a cavity corresponding to the port of the hollow fiber cartridge for allowing assembling of the hollow fiber cartridge and the connector.

In an aspect of the disclosed embodiments, the plurality of tubes is positioned in the circumference of the distributor or the collector in two levels along the axis of the distributor or the collector. The application of two levels increase the mechanical stability and reduces the diameter of the distributor. Similarly, it is preferred that the plurality of tubes is alternatingly dispersed along the axis of the collector. The tubes of the distributor and the collector may be pairwise positioned for accommodating a hollow fiber cartridge. In a preferred aspect the axes of the hollow fiber cartridges are parallel to the axis of the hollow fiber modules. Furthermore, the axes of each the hollow fiber cartridges are suitably positioned in the same radial distance from the axis of the hollow fiber module. Suitably, the axes of the hollow fiber cartridges are positioned with the same angle between neighboring hollow fiber cartridges. Thus, when the hollow fiber module comprises 3 hollow fiber the angle between the axes of two neighboring hollow fibers relative to the axis of the hollow fiber module is suitably 120 degrees. When 4 hollow fiber cartridges are used, then the angle is 90 degrees, when 6 hollow fiber cartridges are used, then the angle is 60 degrees, etc.

In a preferred aspect, the side of the first or second end cap facing the cartridges are provided with cup-shaped receivers for accommodating the corresponding ends of the hollow fiber cartridges. The cup shaped receivers allow for an equal filling of the lumen side of the fibers in a bundle. The equal or even filling of the lumen side result in a better usage of the available membrane area and in turn a higher efficiency. The rim of the cup-shaped receivers is slightly wider in diameter compared to the outer diameter of the shell of the hollow fiber cartridge for allowing accommodation.

In a preferred design, the cup-shaped receivers are provided with a peripheral flange on the inner wall of the cup-shaped receiver for abutment to the shell of a hollow fiber cartridge. The interface between the peripheral flange and the edge of the edge may be provided with a gasket, such as an O-ring, for securing the assembly from leaking.

According to an alternative embodiment, a sealing member, such as an O-ring, is provided between the inner surface of the cup-shaped receivers and the outer face of the hollow fiber shell or a corresponding adapter. This position of the sealing member ensures absorption of radial forces so that the risk of leakage is reduced. In an implementation of the alternative embodiment the adapter at an end proximal to the hollow fiber cartridge is fastened to the surface of the hollow fiber shell and at the other end is provided with the sealing member.

In an embodiment, the hollow fiber module only comprises a single inlet for first solution. However, two or more inlets may be provided to obtain a better distribution of the first solution. When the first solution has entered the end cap suitably the distributor of the first end cap and/or the collector of the second end cap comprises an opening between two neighboring cup-shaped receivers provided at the bottom for allowing exchange of liquid between the cup-shaped receivers. The position of the openings in a distance from the fiber lumen allows the fluid to be mixed before it enters the lumen side, thereby further securing equal filling of the lumen of the fibers. The end cap in the other end of the hollow fiber cartridges collects the treated first solution in cups and the treated first solution is guided through channels in the bottom of the cups to an outlet.

In an aspect of the disclosed embodiments the first or the second end cap is integral with the first or the second connector. This integral construction reduces the number of components for the hollow fiber module and simplifies the construction. Suitably, the connector distributer or connector collector comprises a second solution chamber delimited by a first tube plate accommodating the plurality of hollow fiber cartridges, a second tube plate accommodating the ends of the plurality of hollow fiber cartridges and the end cap, said first and second tube plates being positioned on either side of the ports of the plurality of hollow fiber cartridges. The second solution chamber is in fluid communication with the inlet or outlet for the second solution and the shell side volume via the port.

Suitably, the first tube plate positions the plurality of hollow fiber cartridges liquid tightly inside the cover tube. Usually, two first tubeplates are attached at either end of the cover tube. Further tube plates may be positioned inside the cover tube for further fixation of the plurality of hollow fiber cartridges in the module.

Usually, the second tube plate at the circumference thereof is attached liquid tightly to the interior of the end cap, said cap extending axially to the cover tube to circumscribe a second solution chamber. The liquid tight attachment of the ends of the plurality of hollow fiber cartridges to the second tube plate and the further attachment of the periphery of the second tube plate to the end cap provides for a sealed first solution chamber in liquid communication with the inlet or outlet and the lumen side volume via the ends of the cartridges. Thus, the end cap distributor or collector comprises a first solution chamber delimited by the second tube plate and the interior of the endcap, said first solution chamber being configured for fluid communication with the inlet or outlet of the first solution and the ends of the hollow fiber cartridges.

The number of cartridges is usually 2 or more, such as 3 or more hollow fiber cartridges are present in the hollow fiber module. To obtain a sufficient membrane area it is generally desired to use 4 or more hollow fiber cartridges. In a preferred aspect of the disclosed embodiments, 6 or 7 hollow fiber cartridges are present in the hollow fiber module. In another preferred aspect of the disclosed embodiments, 7 hollow fiber cartridges are present in the hollow fiber module.

In a practical use of the hollow fiber module of the present disclosure it is used for forward osmosis (FO). In the event that the semi-permeable hollow fiber membrane is asymmetrical having a selective skin layer providing for the rejection of some substances while allowing other substances to pass, the selective skin layer may be positioned on the inside or the outside of the hollow fibers. For hollow fiber modules using hollow fibers provided with the skin layer on the inside, the first solution is usually a feed solution intended for concentration and the second solution is a draw solution containing a solute rejected by the skin layer of the hollow fiber. Typically, water is exchanged over the membrane due to the osmotic pressure whereby the first (feed) solution is concentrated/dewatered and the second (draw) solution is diluted. If the selective skin layer is provided on the outside of the fibers, the feed solution is generally the second solution delivered to the shell side for concentration and the draw solution is introduced to the lumen side of the hollow fibers. The forward osmosis process may be assisted by a hydrostatic pressure (PAFO) to increase the water flux.

In another practical application of the hollow fiber module of the disclosed embodiments it is used for reverse osmosis (RO) or nanofiltration (NF). Typically, the feed is subjected to a hydrostatic pressure exceeding the osmotic pressure for having the water of the feed to permeate through the membrane while retaining other components of the feed.

The hollow fiber membrane may be provided by aquaporin water channels as disclosed in WO14108827, WO2017137361, WO2018141985, WO2018167221 or WO18087289, which are all incorporated in the present description by reference.

In a preferred embodiment, the hollow fibers are coated on the inside or outside with a Thin Film Composite (TFC) layer with incorporated aquaporin water channels. It is observed that the term "hollow fibers" as used in the present description and claims also covers capillary and tubular membranes. The support hollow fibers are initially bundled and potted in a shell. The support hollow fibers may be prepared of a polymer such as e.g. polyethersulfone (PES), polysulfone (PS) or polyketone. The support hollow fibers have pores at a size normally used for ultrafiltration.

The TFC layer is generally prepared as a reaction between an aqueous solution comprising a di- or triamine and an apolar solution comprising a di- or triacyl halide. More specifically, the aqueous solution comprising a self-assembled nanostructure comprising polyethyleneimine (PEI), a detergent solubilized aquaporin water channel, and a di- or triamine. The apolar solution comprises a di- or triacyl halide in an apolar organic solvent. Initially, the inside of the hollow fibers is contacted with the aqueous solution for a period of time sufficient for allowing the hollow fibers to absorb the aqueous solution. After removal of excess aqueous solution and optional drying, the apolar solution is added and interfacial polymerization between the reactants are allowed.

The PEI may be a substantially linear or branched polymer having an average molecular weight of between about 2,000 Da to about 10,000 Da, such as between about 3,000 Da to about 5,000 Da. The aquaporin water channels are generally solubilized in a detergent selected from the group consisting of N,N-dimethyldodecylamine N-oxide (LDAO), octyl-glucoside (OG), n-dodecyl β-D-maltoside (DDM), or a combination thereof. The di- or triamine may be m-phenylenediamine (MPD) suitably present in the aqueous solution in a concentration of about 1% to about 5% (w/w).

The di- or triacyl halide may be benzene-1,3,5-tricarbonyl chloride (TMC), which may be present in the apolar solution in a concentration of 0.05% to about 1% (w/v). Generally, the apolar organic solvent is hexane, heptane, octane, or a mixture thereof.

The hollow fiber modules of the present disclosure may be used individually, or several modules may be used assembled in a flow system. When two or more modules are used together, they may be connected in a series or in parallel or in a combination thereof. A flow system comprising of two or more modules in series connection increases the membrane area and allows a more effective treatment of a feed solution.

The foregoing and other objects are achieved by the features of the independent claims. Further implementation forms are apparent from the dependent claims, the description and the figures.

These and other aspects will be apparent from and the embodiment(s) described below.

BRIEF DESCRIPTION OF THE DRAWINGS

In the following detailed portion of the present disclosure, the aspects, embodiments and implementations will be explained in more detail with reference to the example embodiments shown in the drawings, in which.

DETAILED DESCRIPTION

Figures 1, 2:
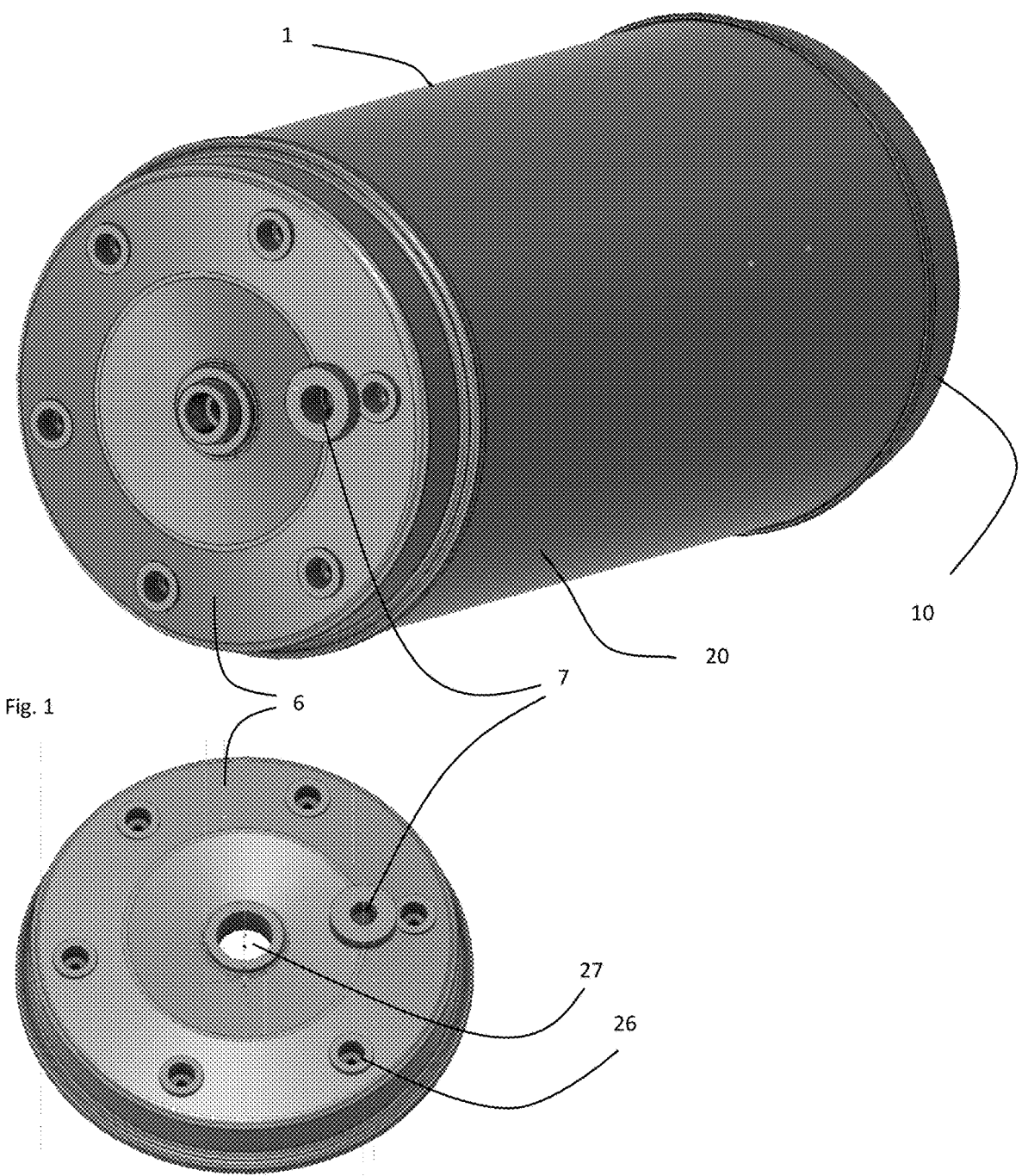
FIG. 1 is a perspective view of the module.
FIG. 2 is a view from above of the end cap.
Figure 3:
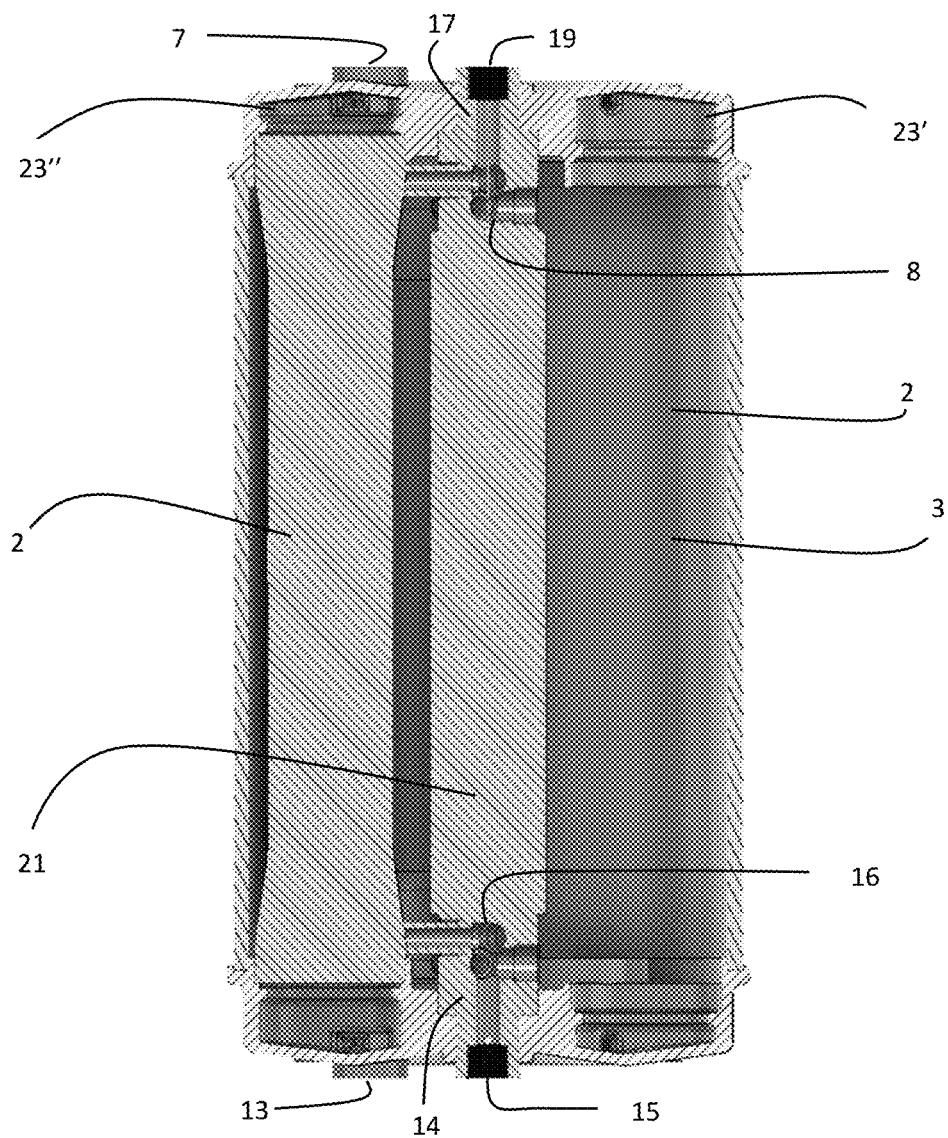
FIG. 3 shows a slicing of the module to peer inside.
Figure 4:
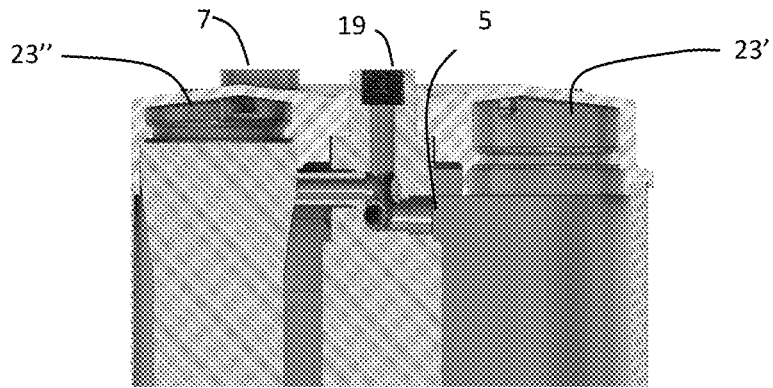
FIG. 4 shows a detailed illustration the embodiment of FIG. 3.
Figure 5:
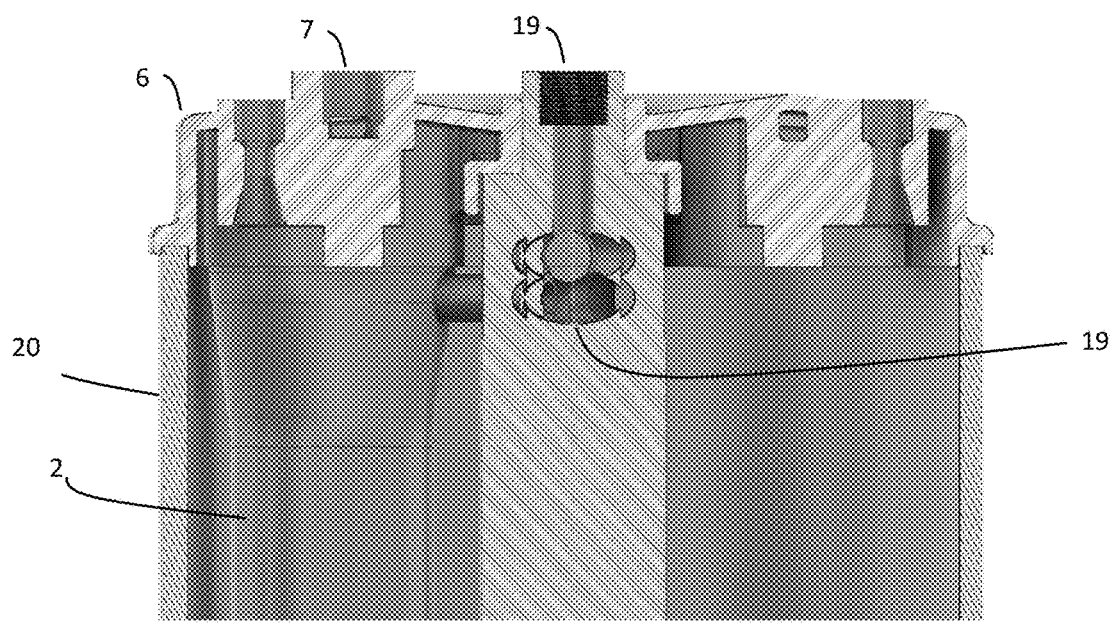
FIG. 5 illustrates a magnified slice of the module.
Figure 6:
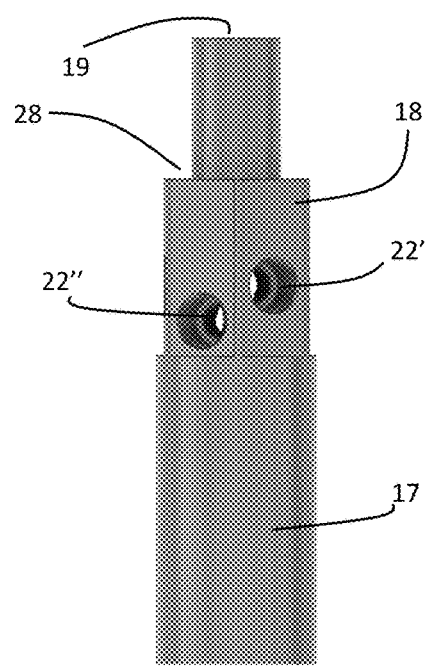
FIG. 6 depicts a part of the connector.
Figure 7:
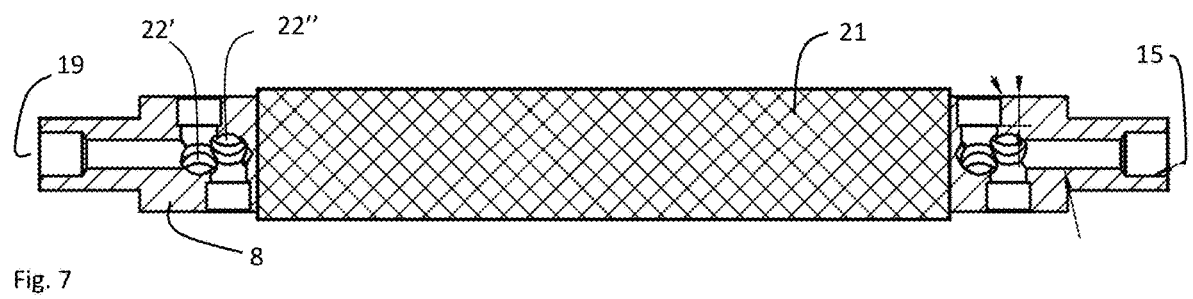
FIG. 7 shows a partly sliced connector.
Figure 8:
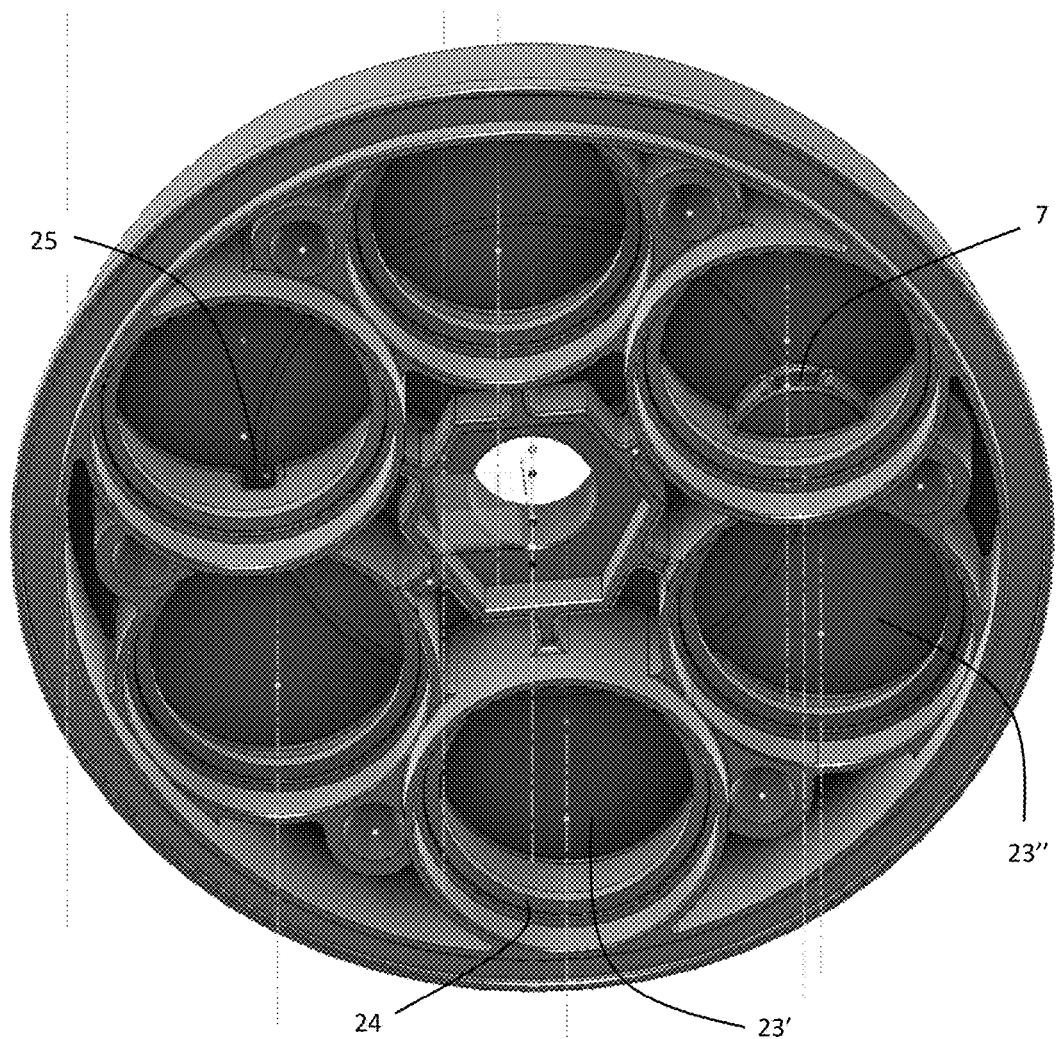
FIG. 8 illustrates a cap of the module viewed from inside.
Figure 9:
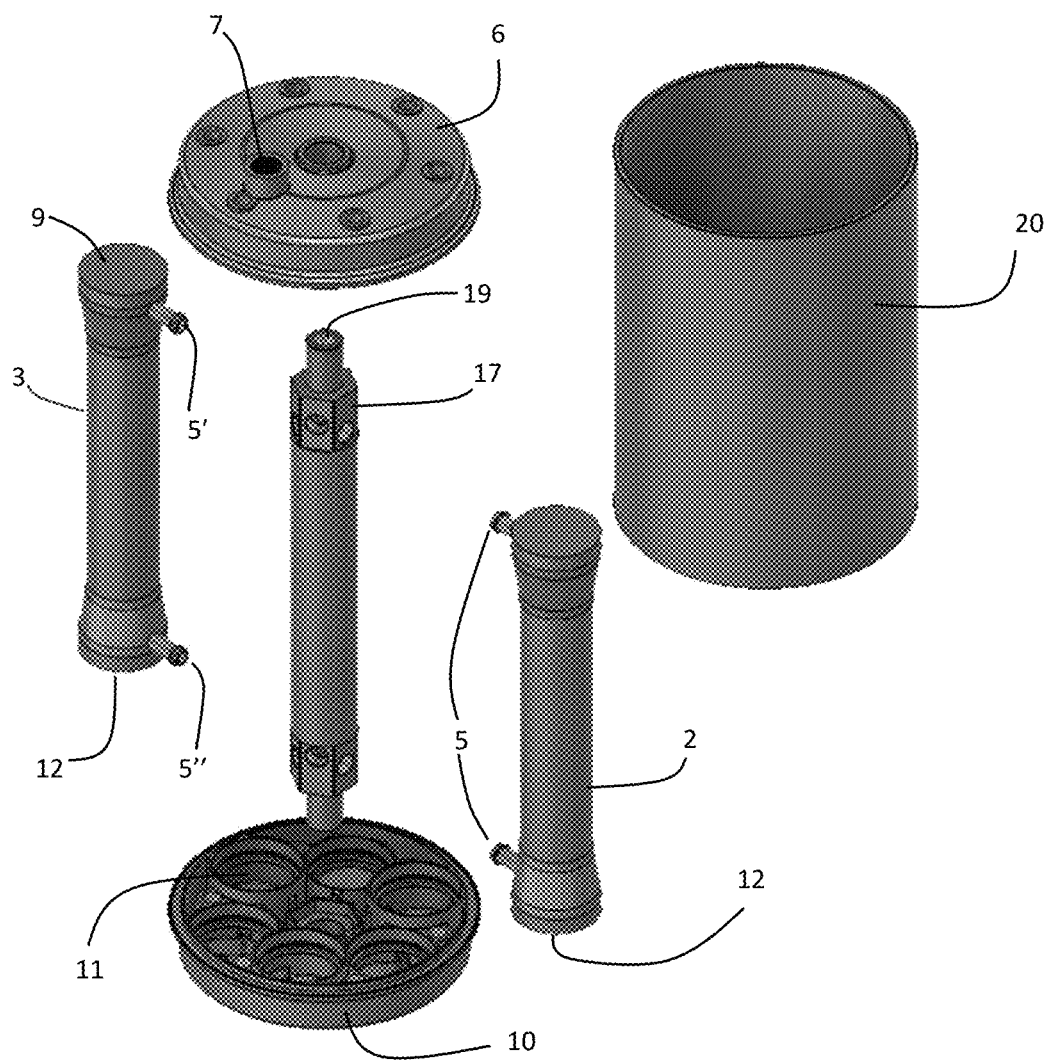
FIG. 9 Shows an explode view of the module in which only two out of 6 cartridges are present.

In the embodiment described below, structures and features that are the same or similar to corresponding structures and features previously described or shown herein are denoted by the same reference numeral as previously used for simplicity.

FIGS. 1 to 9 illustrate the same embodiment of the present disclosure. The hollow fiber module 1 encloses six hollow fiber cartridges 2. Each cartridge comprises a not shown bundle of semi-permeable hollow fibers, i.e. hollow fibers which are permeable to some types of substances but not other types of substances. In the circumference of the bundle of semi-permeable fibers a shell 3 is provided. The shell 3 extends longitudinally along the length of the bundle of hollow fibers. At the ends 9 and 12 of the bundles the fibers are potted using a polymer resin. The polymer resin fixes the individual fibers in the resin matrix and connects to the inside of the end of the shell 3 so that the resin is essentially flush with the edge of the shell. The bundle of semi-permeable fibers is potted in the polymer resin in a was so that the hollow interior of the fibers is available for an afferent or efferent flow of a liquid.

The potting of the fibers in the shell results in a lumen side volume defined by the interior space of the fibers (the lumen) and a shell side volume defined by the exterior space of the fibers delimited by the inside of the shell and the inside of the polymer resin matrix. The shell 3 is provided with a port 5' for receiving a solution and another port 5" for discharging the treated solution. The ports 5' and 5" are distanced from each along the length of the cartridge to allow matter to be exchanged over the semi-permeable membrane when a solution is conveyed from inlet port 5' to outlet port 5". In the embodiment shown, the port is a tap extending radially from the axis of the cartridge. However, other embodiments are imaginable including that the port 5' is just an opening capable receiving a solution from a source and the port 5" is an opening for delivering the treated solution to a recipient.

Six hollow fiber cartridges are positioned in the module. At an end of the module a first end cap 6 is provided. The cap comprises an inlet 7 for a first solution to be treated by the semi-permeable membrane. Inside the first end cap a distribution system distributes the stream of first solution to the first end 9 of each of the hollow fiber cartridges. A second end cap 10 is provided in the other end of the module 1. Inside the second end cap 10 a collector is provided for collecting the treated first solution from the second end of each of the six hollow fiber cartridges. The streams of the treated first solution is collected into single stream and discharged at an outlet 13.

The first and the second end caps 6, 10 are connected at their perimeter through a cover tube 20. The cover tube houses the plurality of cartridges in the longitudinally direction. The end caps are provided with a number of apertures 26 facing each other for allowing fastening means to extend from one end cap to the other for assembling the module. Alternatively, the hollow fiber module may be assembled by gluing or hot melting the edges of the cylindrical cover tube to the perimeter of the first and the second end cap at each end. Apertures may be dispensed with in the latter embodiment.

The hollow fiber module also comprises a first connector 14 that comprises an inlet 15 for the second solution. The inlet is in liquid communication with a distributor 16 for distributing the second solution to a port 5 of each of the hollow fiber cartridges. The distributor comprises a structure complementary to the port of the hollow fiber cartridge for allowing watertight connection when the port and the distributor are engaged. Optionally, an O-ring or glue may be positioned at the end of the port for securing watertight engagement even at moderate pressure i.e., at or below 10 bar. Alternatively, the ports and the tubes may be hot-melted or welded together.

The distributor 16 comprises a number of tubes 22 extending radially from the axis of the connector. In the center of the distributor the tubes are fluidly connected to the inlet. The number of tubes 22 equals the number of hollow fiber cartridges of the hollow fiber module. The radially extending tubes are adapted for accommodating the port 5 of a hollow fiber cartridge.

The multitude of tubes 22' and 22" are axially dispersed along the axis of the distributor to increase the mechanical strength of the module. Thus, three tubes 22' are circumferentially positioned around the axis of the connector in a first level closest to the inlet 15 and the outlet 19, and three other tubes 22" are circumferentially positioned in a second level distal to the inlet 15 and the outlet 19. When a hollow fiber cartridge is connected to the first and second connector port 5' is connected to tube 22' of the first connector and port 5" is connected to tube 22" of the second connector.

After the second solution has been treated in the shell side volume is discharged through port 5". The port is engaged with tubes 22 of the second connector 17. Each of the tubes 22 extends radially from the axis of the connector and are collected in the collector 18 of the connector, where they are fluidly connected to the outlet 19. The first and second connectors may be identical, however, positioned in an opposite direction inside the hollow fiber module.

In the embodiment shown in the figures the first and second connectors 14 and 17 are connected by a central rod 21. The physical connection of the first and second connector increases the mechanical stability of the hollow fiber module and maintains the radially extending tubes 22 in a fixed distance from each other securing easy fitting of the ports 5 of the hollow fiber cartridges into the tubes 22.

The first end cap 6 is provided on the side facing the cartridges with cup-shaped adapters 23' and 23" for accommodating the corresponding ends of the hollow fiber cartridges. The inlet 7 distributes the first solution to 2 neighboring cup-shaped adapters. The first solution is distributed to all the cup-shaped receivers through openings 25 between neighboring cup-shaped receivers provided at the bottom. The cup-shaped receivers have different depths due to the axially displacement of the radially extending tubes. Thus, the cup-shaped receiver 23' has a higher depth that the cup-shaped receiver 23".

The cup-shaped receivers 23' and 23" of the first end cap 6 are provided with a peripheral flange 24 on the inner wall for abutment to the edge of shell 3 of a hollow fiber cartridge 2. A sealing member such as an O-ring may be positioned between the flange 24 and the edge of the shell to prevent leakage, notably when a hydrostatic pressure is provided on the first solution.

Similarly, the second end cap 10 is provided on the side facing the cartridges with cup-shaped adapters 23' and 23" for accommodating the corresponding ends of the hollow fiber cartridges. The outlet 13 collects the first solution from 2 neighboring cup-shaped adapters. The first solution is collected from the other cup-shaped receivers through openings 25 between neighboring cup-shaped receivers provided at the bottom. The cup-shaped receivers have different depths due to the axially displacement of the radially extending tubes 22' and 22". Thus, the cup-shaped receiver 23' has a higher depth that the cup-shaped receiver 23".

The cup-shaped receivers 23' and 23" of the second end cap 10 are provided with a peripheral flange 24 on the inner wall for abutment to the edge of shell 3 of a hollow fiber cartridge 2. A sealing member such as an O-ring may be positioned between the flange 24 and the edge of the shell to prevent leakage, notably when a hydrostatic pressure is provided on the first solution.

The center of the first and the second end is provided with an aperture 27 capable of receiving the end part of the first and second connector 14, 17, respectively. The connectors are provided with a flange 28, that abuts the inside of the end caps around the aperture. A resilient sealing member, such as an O-ring may be provided for absorbing chocks in the event the module is roughly handled.

Figure 10:
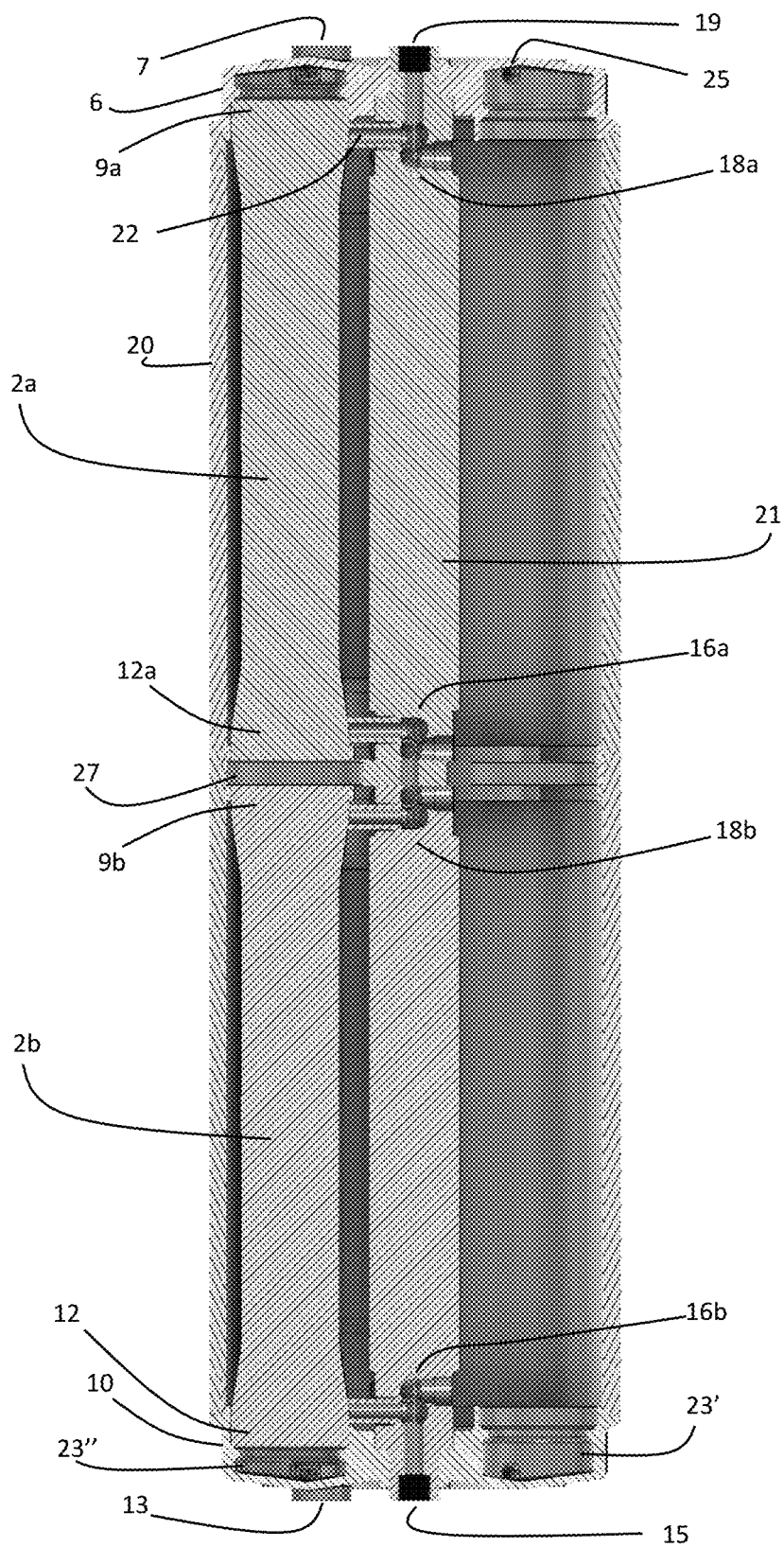
FIG. 10 shows an embodiment in which cartridges are positioned in extension of each other.

FIG. 10 shows an embodiment of the present disclosure in which cartridges are positioned in extension of each other to obtain a hollow fiber module containing twelve hollow fiber cartridges 2. At an end of the module a first end cap 6 is provided. The cap comprises an inlet 7 for a first solution to be treated by the semi-permeable membrane. Inside the first end cap a distribution system distributes the stream of first solution to the first end 9 of each of the hollow fiber cartridges. A second end cap 10 is provided in the other end of the module 1. Inside the second end cap 10 a collector is provided for collecting the treated first solution from the second end of each of the six hollow fiber cartridges. The streams of the treated first solution is collected into a single stream and discharged at an outlet 13.

The first and the second end caps 6, 10 are connected at their perimeter through a cover tube 20. The cover tube houses the plurality of cartridges in the longitudinally direction. The end caps are provided with a number of apertures 26 facing each other for allowing fastening means to extend from one end cap to the other for assembling the module. Alternatively, the hollow fiber module may be assembled by gluing or hot melting the edges of the cylindrical cover tube to the perimeter of the first and the second end cap at each end. Apertures may be dispensed with in the latter embodiment.

The hollow fiber module also comprises a first connector that comprises an inlet 15 for the second solution. The inlet is in liquid communication with a distributor 16 for distributing the second solution to a port 5 of each of the hollow fiber cartridges. The distributor comprises a structure complementary to the port of the hollow fiber cartridge for allowing watertight connection when the port and the distributor are engaged. Optionally, an O-ring may be positioned at the end of the port for securing watertight engagement even under moderate pressure i.e., at or below 10 bar.

The distributor 16 comprises a number of tubes 22 extending radially from the axis of the connector. In the center of the distributor the tubes are fluidly connected to the inlet. The number of tubes 22 equals the number of hollow fiber cartridges of the hollow fiber module. The radially extending tubes are adapted for accommodating the port 5 of a hollow fiber cartridge.

After the second solution has been treated in the shell side volume is discharged through port 5". The port is engaged with tubes 22 of the second connector 17. Each of the tubes 22 extends radially from the axis of the connector and are collected in the collector 18 of the connector, where they are fluidly connected to the outlet 19. The first and second connectors may be identical, however, positioned in an opposite direction inside the hollow fiber module.

In the embodiment shown in the figures the first and second connectors 14 and 17 are connected by a central rod 21. The physical connection of the first and second connector increases the mechanical stability of the hollow fiber module and maintains the radially extending tubes 22 in a fixed distance from each other securing easy fitting of the ports 5 of the hollow fiber cartridges into the tubes 22.

The upper set of hollow fiber cartridges 2a and the lower set in hollow fiber cartridges 2b are connected by an annular spacer 27. Thus, when the first solution is treated in the lumen side volume of a hollow fiber cartridge 2a it is discharged at the second end 12a into a volume defined by the spacer, the second end 12a of the upper hollow fiber cartridge 2a, and the first end 9b of the lower hollow fiber cartridge 2b. Subsequently, the first solution is conveyed from the spacer volume into the lumen side volume of the lower cartridge 2b.

The second solution is first treated in shell side volume of the lower set of hollow fiber cartridges 2b. The outlet 19b of the lower set of cartridges is in liquid communication with the inlet 15a of the upper set of hollow fiber cartridges 2a. The coupling of an upper set and a lower set of hollow fiber cartridges allows for the first solution to be treated twice for a more effective filtration.

Figure 11:
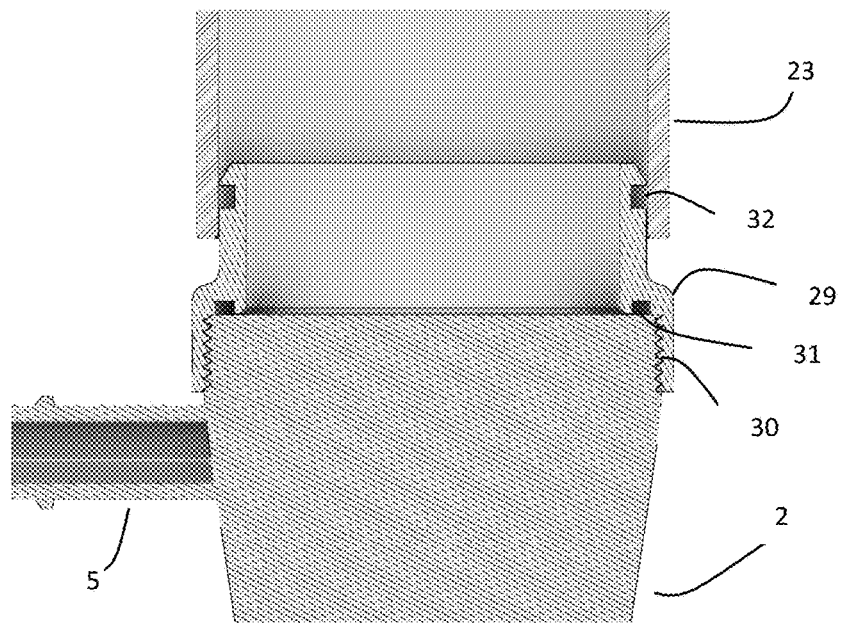
FIG. 11 shows a second embodiment using an adapter between a cup-shaped receiver and the hollow fiber cartridge.

FIG. 11 discloses an embodiment in which an adapter 29 is used for coupling of the hollow fiber cartridge 2 with the cup-shaped receiver 23. The adapter comprises in the end proximal to the cup-shaped receiver a groove 32 for accommodating a rubber O-ring not shown on the figure. On the part of the adapter proximal to the hollow fiber cartridge a tread is provided for securely attachment to the hollow fiber shell having a corresponding tread. An inner groove 31 is provided with an O-ring allowing for water-tight engagement between the shell of the hollow fiber cartridge and the adapter. The position of an O-ring in the circumferential groove 32 allows the engagement to wobble, i.e. perform minor movements without leakage.

Figure 12:
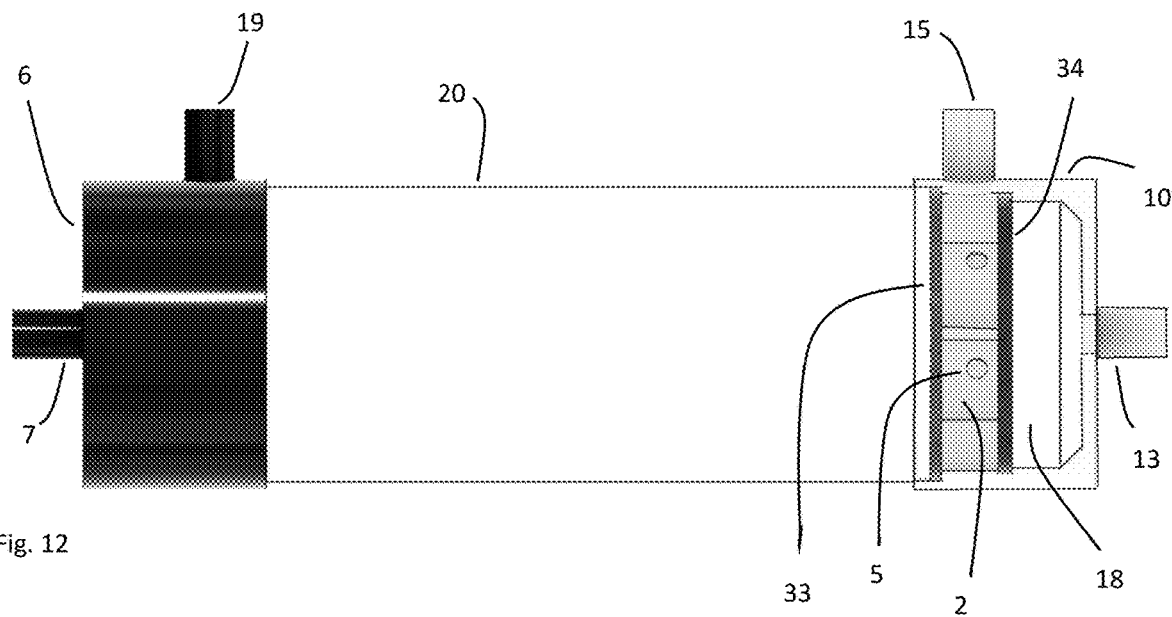
FIG. 12 discloses an embodiment in which the end cap is integral with the connector.
Figure 13:
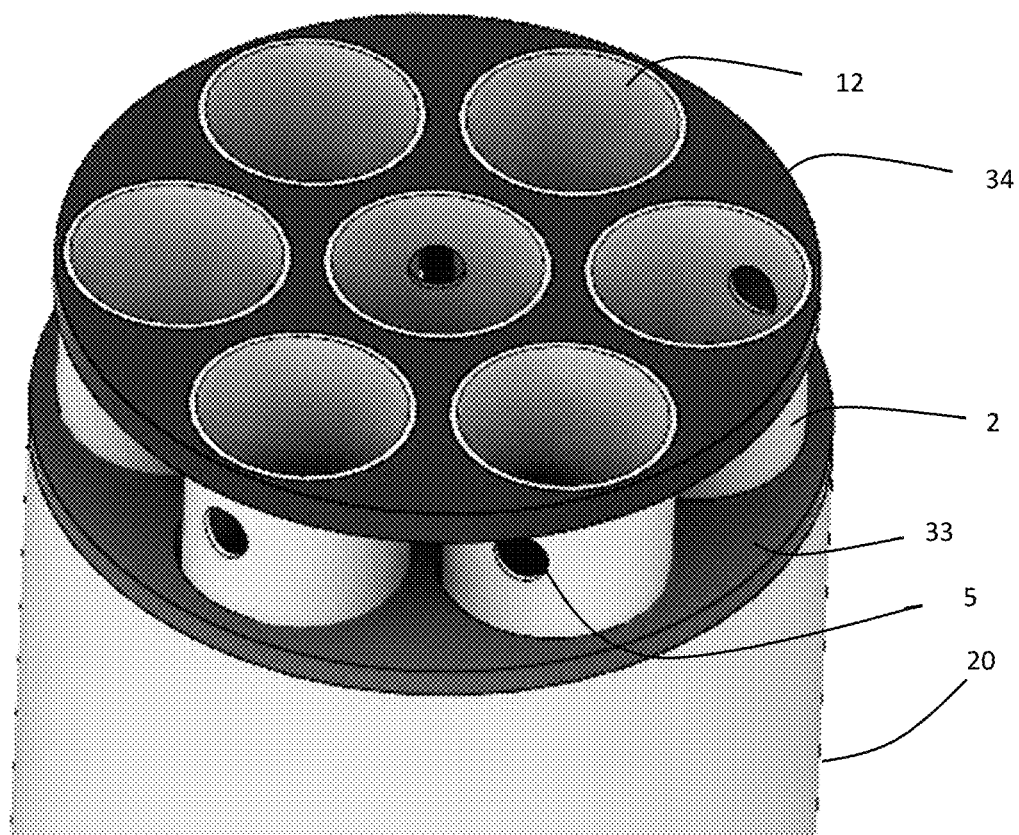
FIG. 13 shows a detail of the third embodiment in which the end cap has been removed.

FIG. 12 discloses an embodiment of the present disclosure in which the end cap is integral with the distributor and/or collector. FIG. 13 shows a perspective view of the same embodiment. 7 hollow fiber cartridges are provided in which the port 5 is an aperture for allowing the second solution to enter or exit. In the figures only a single aperture is provided for each hollow fiber cartridge, however, it would be within the ability of the person skilled in the art to suggest further apertures in the shell of the cartridges, such as 2, 3, 4, 5, or 6 apertures position along the periphery of the shell of the hollow fiber cartridges. The hollow fiber cartridges are held in position in the cover tube 20 by a first tube plate 33 provided on both sides of the cover tube 20 and positioned below the apertures. First tube plates 33 are provided with 6 apertures close to the circumference of the tube plate and a single aperture at the center, allowing for accommodation of 7 hollow fiber cartridges in each module. The first tube plates 33 are at their perimeter attached to periphery of the cover tube to form a structure fixing the hollow fiber cartridges in the cover tube.

An end section comprising the ports of each of the hollow fiber cartridge protrudes from the first tube plate 33 and is at their end connected to a second tube plate 34, thereby forming a chamber for the second solution when the end cap is positioned. The second solution chamber is in fluid connection with the inlet or outlet for the second solution and the apertures of the plurality of hollow fiber cartridges, thus allowing the second solution to flow from inlet 15 to the second solution chamber for distribution to the shell side volume via the apertures 5.

While only a single inlet (or outlet) has been shown on the end cap in the figures, it would be within the ability of the person skilled in the art to provide multiple inlets along the perimeter of the hollow fiber module. Thus, 1, 2, 3, 4, 5, 6, or more inlet may be provided along the perimeter for even distribution of the second solution.

The first solution to be treated in the hollow fiber modules enters at inlet 7 and is distributed to the ends of the hollow fiber cartridges. The corresponding collection of the treated first solution is shown at the other end. Thus, the treated first solution exits from the hollow fibers into the first solution chamber 18 delimited by the tube plate 34 at one side and the cylindrical walls of the end cap along the circumference. The treated first solution exits at outlet 13. While only a single inlet to or outlet from the first solution chamber is shown on the figures, it would be within the ability of the person skilled in the art to provide multiple inlets to and outlets from the first solution chamber in order to obtain a more even distribution of the first solution. Furthermore, inside the end cap flow distribution means may be provided for mixing and distributing equalized amounts of first solution to the ends of the hollow fiber cartridges.

EXAMPLES

The hollow fiber module according to the present disclosure was tested in a forward osmosis setup. The feed solution (i.e. first solution) is pure water coming directly from a reverse osmosis system at a flow rate of 500 LPH (liters per hour). The draw solution is 1M sodium chloride and was introduced at a velocity of 200 LPH. The results show that the water flux (Jw) is 13.5 LMH, the reverse salt flux (Js) is 1.1 GMH. The specific salt flux can be calculated as 0.08 g/L.

The pressure stability of the hollow fiber module was tested at a feed rate of 360 LPH and a draw rate of 150 LPH. The transmembrane pressure was 1.54 bar which the module was able to withstand without leakage. The specific salt flux was maintained at 0.08 g/L. In another experiment, the transmembrane pressure was increased to 6.5 bar inlet pressure without leakage.

A hollow fiber module was supplied with feed solution and draw solution in counter-current and in co-current mode. The results show that in the counter-current setup the flux was 12.09 LMH and the reverse salt flux was 1.16 GMH. In the co-current mode, the flux was measured as 12.33 LMH and the reverse salt flux was 1.14 GMH. Thus, regardless of the way of setting up the feed and the draw solution, the module has essentially the same performance.

In another experiment, the module was placed in a horizontal and a vertical position. In the horizontal position and counter-current setup the flux was measured as 12.25 LMH and the reverse salt flux was measured as 1.18 GMH. When the module was positioned in the vertical position and the feed was introduced as the bottom, the flux was measured as 12.25 and the reverse salt flux was measured as 1.15 GMH. Thus, regardless of the position of the module, the performance remains essential the same.

The invention claimed is:

1. A hollow fiber module comprising a plurality of hollow fiber cartridges, wherein
   a. each hollow fiber cartridge comprises a bundle of semi-permeable hollow fibers, said bundle being surrounded by a shell extending longitudinally along the length of the bundle and potted at both ends in a resin, thereby defining a lumen side volume for the treatment of a first solution and a shell side volume for the treatment of a second solution such that the first solution or the treated first solution and the second solution or the treated second solution are not in fluid communication other than across the semi-permeable hollow fibers, said shell being provided with a first port for receiving the second solution to be treated in the shell side volume and a second port for discharging the treated second solution only,
   b. a first end cap comprising an inlet for the first solution and an end cap distributor for distributing the first solution to a first end of each of the hollow fiber cartridges,
   c. a second end cap comprising an end cap collector for collecting the treated first solution from a second end of each of the hollow fiber cartridges and an outlet for the treated first solution,
   d. a first connector comprising an inlet for the second solution and a connector distributor for distributing the second solution to the first port of each of the hollow fiber cartridges, and
   e. a second connector comprising a connector collector for collecting the treated second solution from the second port of each of the hollow fiber cartridges and an outlet for the treated second solution,
   wherein the connector distributor or the connector collector comprises a plurality of tubes in fluid connection with the inlet for the second solution or the outlet for the second solution, respectively, said tubes being adapted for accommodating a port of a hollow fiber cartridge,
   wherein the plurality of tubes is open to the circumference of the connector distributor or the connector collector, and wherein the position of the tubes open to the circumference is axially dispersed in two levels in relation to an axis of the connector distributor or the connector collector, and
   wherein the first and second end caps are connected at their perimeter with a cover tube, said cover tube enclosing the plurality of cartridges in the longitudinal direction.

2. The hollow fiber module according to claim 1, wherein the first and second connector are connected by a central rod.

3. The hollow fiber module according to claim 1, wherein the first or the second end cap is integral with the first or the second connector.

4. The hollow fiber module according to claim 3, wherein the connector distributor or the connector collector comprises a second solution chamber delimited by a first tube plate with apertures for accommodating the plurality of hollow fiber cartridges, a second tube plate accommodating the ends of the plurality of hollow fiber cartridges and the end cap, said first and second tube plates being axially positioned on either side of the ports of the plurality of hollow fiber cartridges relative to the longitudinal extent of the cartridges such that the second solution chamber is liquid-tight.

5. The hollow fiber module according to claim 4, wherein the second tube plate at a circumference thereof is attached liquid tightly to an interior face of the end cap, said end cap extending axially to the cover tube to circumscribe the second solution chamber.

6. The hollow fiber module according to claim 4, wherein the end cap distributor or the end cap collector comprises a first solution chamber delimited by the second tube plate and the interior of the endcap, said first solution chamber being configured for fluid communication with the inlet or outlet of the first solution and the ends of the hollow fiber cartridges.

7. The hollow fiber module according to claim 1, wherein 3 or more hollow fiber cartridges are present in the hollow fiber module.

8. The hollow fiber module according to claim 1, wherein 6 or 7 hollow fiber cartridges are present in the hollow fiber module.

9. A hollow fiber module comprising a plurality of hollow fiber cartridges, wherein
   a. each hollow fiber cartridge comprises a bundle of semi-permeable hollow fibers, said bundle being surrounded by a shell extending longitudinally along the length of the bundle and potted at both ends in a resin, thereby defining a lumen side volume for the treatment of a first solution and a shell side volume for the treatment of a second solution such that the first solution or the treated first solution and the second solution or the treated second solution are not in fluid communication other than across the semi-permeable hollow fibers, said shell being provided with a first port for receiving the second solution to be treated in the shell side volume and a second port for discharging the treated second solution only,
   b. a first end cap comprising an inlet for the first solution and an end cap distributor for distributing the first solution to a first end of each of the hollow fiber cartridges,
   c. a second end cap comprising an end cap collector for collecting the treated first solution from a second end of each of the hollow fiber cartridges and an outlet for the treated first solution,
   d. a first connector comprising an inlet for the second solution and a connector distributor for distributing the second solution to the first port of each of the hollow fiber cartridges, and
   e. a second connector comprising a connector collector for collecting the treated second solution from the second port of each of the hollow fiber cartridges and an outlet for the treated second solution,
   wherein the first and second end caps are connected at their perimeter with a cover tube, said cover tube enclosing the plurality of cartridges in the longitudinal direction,
   wherein the first or the second end cap is integral with the first or the second connector, and
   wherein the connector distributer or connector collector comprises a second solution chamber delimited by a first tube plate with apertures for accommodating the plurality of hollow fiber cartridges, a second tube plate accommodating the ends of the plurality of hollow fiber cartridges and the end cap, said first and second tube plates being axially positioned on either side of the ports of the plurality of hollow fiber cartridges relative to the longitudinal extent of the cartridges such that the second solution chamber is liquid-tight.

* * * * *